United States Patent [19]

Ichimura

[11] Patent Number: 5,469,232
[45] Date of Patent: Nov. 21, 1995

[54] EYEGLASSES WITH SPRING TEMPLES

[75] Inventor: Masami Ichimura, Sabae, Japan

[73] Assignee: Sunreeve Company Limited, Fukui, Japan

[21] Appl. No.: 353,183

[22] Filed: Dec. 9, 1994

[51] Int. Cl.[6] .................................................. G02C 5/14
[52] U.S. Cl. ........................ 351/111; 351/113; 351/116
[58] Field of Search ................................. 351/111, 113, 351/116, 121, 153; 16/228

[56] References Cited

U.S. PATENT DOCUMENTS 1,284,071   3/1918   Dorney .................................. 351/116

Primary Examiner—William L. Sikes
Assistant Examiner—Huy Mai
Attorney, Agent, or Firm—Weingarten, Schurgin, Gagnebin & Hayes

[57] ABSTRACT

Eyeglasses with spring temples that the temples can be opened exceeding en opening angle of 90 degrees, and are provided with a spring force to some extent in the folding direction so as to fit people with a wide face or a narrow face. Mounting portions of the temples are made of two wire rods, ends of the two wire rods are bent to form engaging pieces, receiving members disposed on a glasses frame are formed with two engaging holes in parallel substantially along the width direction of the glasses frame, and the engaging pieces of the mounting portions are fitted into the two engaging holes to attach the temples. Each temple body is made of one wire rod bent into a double line, and its starting end and terminating end have the engaging pieces provided to form the mounting portions.

2 Claims, 1 Drawing Sheet

EYEGLASSES WITH SPRING TEMPLES

BACKGROUND OF THE INVENTION

1. Field of the Invention

This invention relates to eyeglasses with spring temples.

2. Background Art

Generally, temples of eyeglasses are screwed with a small screw to hinge fittings which are attached to both ends of a frame and can be folded and opened in a range of about 90 degrees.

To select a glasses frame, it is necessary not only to consider a design and a material, but also to select one having a size suitable to your face width and a distance between eyes.

However, the temples have an opening angle limited in a range of about 90 degrees is described above and do not open exceeding the above angle, so that they sometimes do not fit people with a wider face. Conversely, for people with a narrower face than a regular-size face, the temples have an excessive opening angle. But, since the temples fall in a stable state when they are opened completely, they cannot be held at a smaller opening angle. Therefore, it is necessary to bend the end pieces of the temples or to curve the middle of each temple to fit the glasses frame to a face width.

This invention has been completed to remedy the above disadvantages and it is an object of the present invention to provide eyeglasses having spring temples that the temples can have en opening angle exceeding 90 degrees, and a spring force to some extent toward-the folding direction so as to fit a narrow or wide face.

SUMMARY OF THE INVENTION

According to a first aspect of the present invention, eyeglasses with spring temples are provided, which comprise glasses, a glasses frame and a pair of temples, said glasses frame having receiving members at either ends of glasses frame, each of said receiving members having two engaging holes in parallel substantially along with the width direction of the frame, said temples having mounting portions, said mounting portions being formed of two wire rods end having engaging pieces formed by bending the ends of two wire rods so as the engaging pieces of the mounting portions are fitted into the two engaging holes to attach the temples to the frame and thereby the temples have a function of a spring.

According to a second aspect of the present invention, eyeglasses with spring temples according to claim 1 are further provided, wherein each temple is made of one wire rod bent into a double line, and its starting end terminating end are formed as said engaging pieces provided to form the mounting portions.

The objects and advantages of the present invention will become apparent from the detailed description to follow taken in conjunction with the appended claims.

DETAILED DESCRIPTION OF THE PREFERRED EMBODIMENTS

Embodiments of this invention will be described in detail with reference to the attached drawings.

Figure 1:
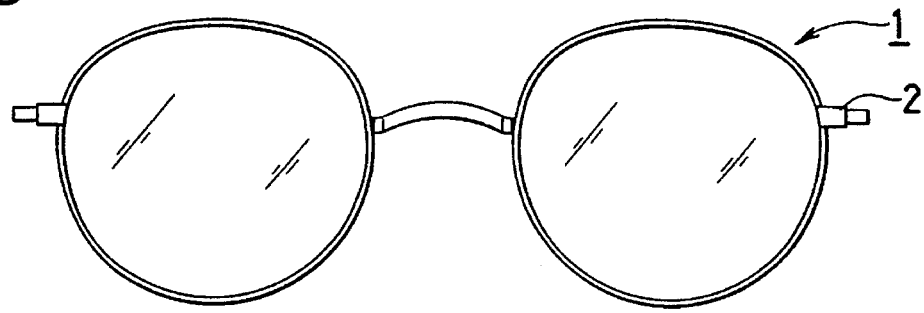
FIG. 1 is a front view showing one embodiment of the present invention.

In FIG. 1, reference numeral 1 is a glasses frame made of a metal, and a receiving member 2 is disposed on either side of the frame to attach a temple. The receiving member 2 has the form of substantially a letter C as shown in FIG. 3 and two engaging holes 2a, 2b formed in parallel substantially along the width direction of the glasses frame 1.

Figure 2:
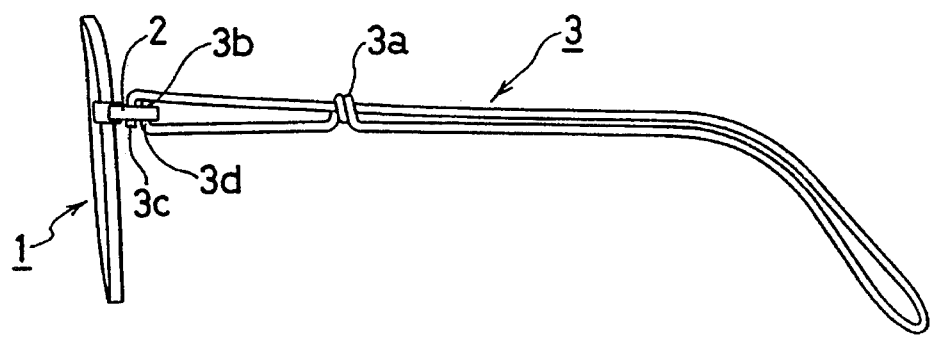
FIG. 2 is a side view of FIG. 1.

Reference numeral 3 represents a temple which is formed by bending one metallic wire rod into a double line as shown in FIG. 2, the lower line is wound on the upper line at a point slightly toward the leading end from the middle of the temple to form a wound part 3a, the starting end of the upper line is bent downward at a mounting portion 3b at the leading end to form an engaging piece 3c, the terminating end of the lower line is bent upward to form an engaging piece 3d, and the downward engaging piece 30 is positioned slightly inside (the wound part 3a) from the upward engaging piece 3d.

The temple 3 can be attached to the glasses frame 1 by fitting the downward engaging piece 3c of the mounting portion 3b into the engaging hole 2a of the receiving member 2 from above and fitting the upward engaging piece 3d into the other engaging hole 2b from below.

Figure 3:
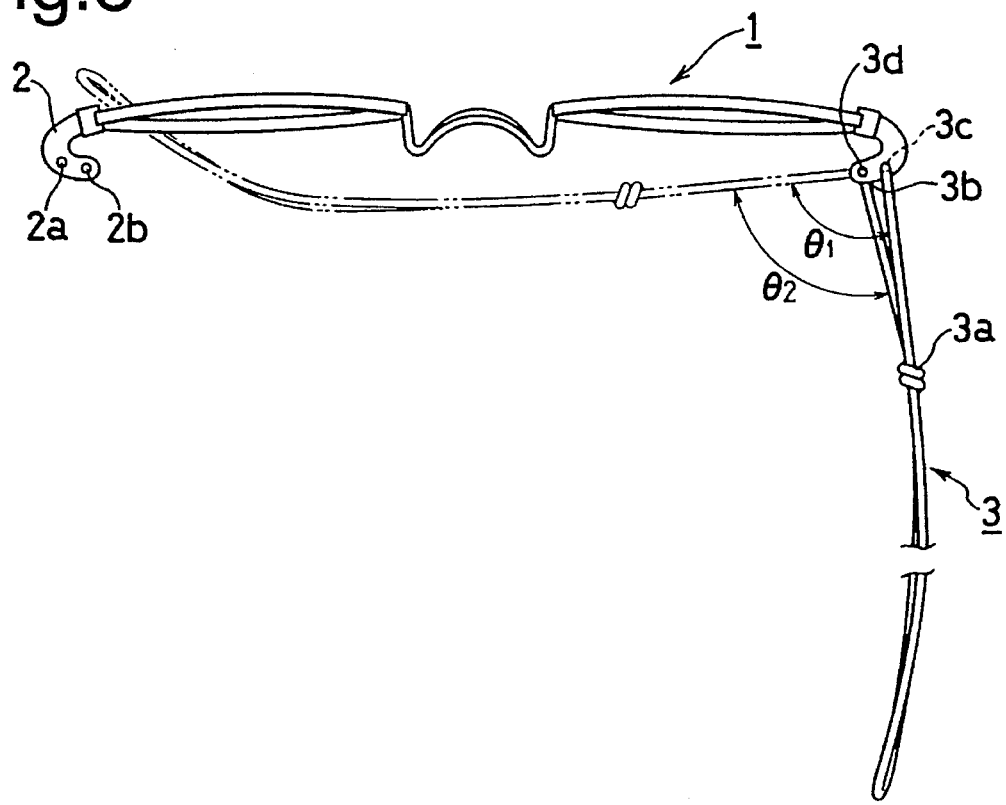
FIG. 3 is an explanatory view showing the temple in folded and opened states according to the present invention.

The temple 3 in the folded state does not generate a spring force because the direction of the mounting portion 3b agrees with the parallel direction of the two engaging holes 2a, 2b of the receiving member 2 as indicated by the imaginary line in FIG. 3. But, the temple 3 in the open state generates a spring force because the direction of the mounting portion 3b is square to the parallel direction of the two engaging holes 2a, 2b of the receiving member 2 as indicated by the solid line in FIG. 3, producing a difference between the opening angles of the two lines at the mounting portion.

More specifically, the engaging pieces 3c, 3d of the mounting portion 3b of the temple 3 are fitted into the different engaging holes 2a, 2b as described above, and these engaging holes 2a, 2b are displaced horizontally (the width direction of the glasses frame 1). Therefore, the upper Wire rod having the engaging piece 3c and the lower wire rod having the engaging piece 3d have different opening angles, θ1 end θ2, and this difference produces turning torque to generate a spring force which works to return the temple 3 in the folding direction.

This spring force gradually increases as the temple 3 is opened wider but is not so strong that a face is tightened or pressed strongly. Therefore, there is no trouble to wear the eyeglasses. The opening angle of the temple 3 is not limited to a range of about 90 degrees unlike a conventional connection using a hinge, and can be opened to a larger angle.

Therefore, this temple can be applied to any people with a wide face or a narrow face, and a comfortable feeling of wearing the eyeglasses is improved because the stability of the temples end the condition of the end pieces are improved. Besides, a breakage of the temples by external forces can be prevented from occurring. Opening the temple 3 at a large angle produces a warp, but the warp is self-absorbed because the temple 3 itself elastically deforms slightly.

Besides, since the temple 3 is mounted by simply fitting the engaging pieces of the mounting portion into the engaging holes of the receiving member, a conventional small screw is not needed and a production efficiency is improved. And inconveniences in using the eyeglasses, that the temple becomes unsteady due to a loosened screw or it comes off because the screw is lost, can be prevented.

Since the temple 3 has a very simple structure which is formed by bending one wire rod into a double line, a production cost can be reduced, it has an original design and is outstanding, and it is lightweight end used easily.

The temple is not limited to the one described in the embodiment. The mounting portion of a conventionally formed temple can be made of two wire rods, and the leading ends of the two wire rode can be bent to provide engaging pieces end fitted as described above.

[EFFECT OF THE INVENTION]

When the temples are in a folded condition, the direction of the mounting portions of the temples agrees with the parallel direction of the two engaging holes, so that no spring force is generated by the temples. But, when the temples are opened, the direction of the mounting portions of the temples is at right angles to the parallel direction of the two engaging holes, and the fitting positions of the engaging pieces are dislocated horizontally to produce a difference between turning angles of the two wire rods of the temple mounting portions, so that a spring force is generated in the folding direction of the temples by the difference. And, the opening angle of the temples is not limited to about 90 degrees and may be larger than that angle.

Thus, according to this invention, the temples can be opened exceeding an opening angle of 90 degrees and are provided with a spring force to some extent in the folding direction so as to fit people with a wide face or a narrow face. Accordingly, this invention has remarkable effects that it is not necessary to bend the end pieces of the temples or to curve the middle of each temple to fit the glasses frame to a face width.

What is claimed is:

1. Eyeglasses with spring temples comprising glasses, a glasses frame and a pair of temples, said glasses frame having receiving members et either ends of the glasses frame, each of said receiving members having two engaging holes in parallel substantially along with the width direction of the free, said temples having mounting portions, said mounting portions being formed of two wire rods and having engaging pieces formed by bending the ends of two wire rods so as that the engaging pieces of the mounting portions are fitted into the two engaging holes to attach the temples to the frame and thereby the temples have a function of a spring.

2. Eyeglasses with spring temples according to claim 1, wherein each temple is made of one wire rod bent into a double line, end its starting end and terminating end ere formed as said engaging pieces provided to form the mounting portions.

\* \* \* \* \*

UNITED STATES PATENT AND TRADEMARK OFFICE
CERTIFICATE OF CORRECTION

PATENT NO. : 5,469,232
DATED : November 21, 1995
INVENTOR(S) : Masami Ichimura

It is certified that error appears in the above-indentified patent and that said Letters Patent is hereby corrected as shown below:

Title page, item [57], col. 2,
In the Abstract, line 2, "en opening" should read --an opening--.

Column 1, line 45, "end having" should read --and having--.

Column 1, line 53, "end terminating" should read --end and terminating--.

Column 2, line 20, "piece 30" should read --piece 3c--.

Column 3, line 9, "end used" should read --and used--.

Column 3, line 13, "rode can" should read --rods can--.

Column 4, line 13, "et" should read --at--.

Column 4, line 25, "end ere" should read --end are--.

Signed and Sealed this

Thirtieth Day of July, 1996

Attest:

BRUCE LEHMAN

*Attesting Officer*     *Commissioner of Patents and Trademarks*